3,110,698
POLYESTERS OF CARBONYLDICHLORIDES AND PROCESS FOR POLYMERIZATION AND DOPE MAKING
Thomas M. Laakso, David A. Buckley, and James R. King, Rochester, N.Y., assignors to Eastman Kodak Company, Rochester, N.Y., a corporation of New Jersey
No Drawing. Filed Mar. 12, 1959, Ser. No. 798,821
1 Claim. (Cl. 260—47)

This invention relates to improvements in the preparation of linear polyesters derived from bisphenols such as bisphenol A condensed with phosgene or other carbonyl dichlorides.

Linear thermoplastic polycarbonates can be made as shown by the prior art by reacting a bisphenol, viz. a di-(monohydroxyaryl)-substituted aliphatic or cycloaliphatic hydrocarbon with (a) a diester of carbonic acid, or (b) phosgene, or (c) a bis-chlorocarbonic ester of a bisphenol. The aryl radicals of such bisphenols may carry inert substituents, e.g. alkyl or aryl groups or halogen atoms.

Reactions involving the diesters of carbonic acid can be effected at 50–320° C. Reaction with phosgene can be effected (i) by introducing phosgene into a solution of the bisphenol in an organic base, e.g. dimethylaniline, trimethylamine or pyridine; (ii) by introducing phosgene into a solution of the bisphenol in an inert solvent, e.g. benzene, ligroin, cyclohexane, methylcyclohexane, benzene, toluene, xylene, white spirit, chloroform, methylene dichloride, carbon tetrachloride, trichloroethylene, dichloroethane, methyl acetate or ethyl acetate, with the addition of an acid-binding agent, e.g. pyridine; or (iii) by introducing phosgene into an aqueous solution or suspension of an alkali metal or alkaline earth metal salt of the bisphenol preferably in presence of excess of a base and, if desired, in presence of an inert solvent of the type mentioned above, which is capable of dissolving phosgene and the produced polycarbonate. Reaction between the bisphenols and their bis-chlorocarbonic esters may be effected under the same conditions as described above for the process using phosgene (see iii) and as a catalyst a mixture of zinc and lead oxide or the like may be used. Chain-terminating agents may be included in the reaction mixture, e.g. phenol, tert.-butylphenol, cyclohexylphenol, 2,2-(4-hydroxyphenyl)-propane, aniline or methyl aniline. Oxidation inhibitors may also be added, e.g. sodium or potassium sulphite, sulphide or dithionate; phenol or p-tert.-butylphenol, etc.

Some of the polycarbonates known in the art are soluble in petroleum, benzene, toluene, o-, m- and p-xylene, ethyl and butyl acetate, acetone and cyclohexane, phenol, o-, m- and p-cresol, methylene chloride, chloroform, chlorobenzene, dimethyl formamide and pyridine and may be worked up from solution into film, fibers or lacquer coatings. They may also be worked up into shaped articles or coatings by pressing, spraying or flame-spraying. Some of the polycarbonates are crystalline and produce from the melt fibers or films which may be orientated by stretching. Plasticizers, e.g. dioctyl phthalate, tricresyl phosphate, or fillers, e.g. asbestos or glass fibers, or dyes, pigments, carbon black, $TiO_2$, etc. may be added.

Further details as to the prior art are set forth in British Patent 772,627, Belgian Patent 559,191 and a number of German patents including patents by H. Schnell who is also the author of an article in Angewandte Chemie 68: 633–660, No. 20 published October 21, 1956. As pointed out by Schnell, the idea of preparing polyesters of carbonic acid goes back as far as 1898 with regard to work done by Einhorn as confirmed by subsequent work by Bischoff reported in 1902 and later systematically investigated by Carothers et al. as reported in 1930, J. Am. Chem. Soc. 52: 314.

The technique developed by Schnell involving the use of bis(hydroxyphenyl)alkanes is described in the cited article and involves the use of a great number of bisphenol compounds which can be easily prepared by various techniques and a large number of such bisphenols are listed by Schnell. Other such compounds are listed in British 772,627 and in Belgian 546,375.

It is an object of the present invention to provide improvements in the technique developed by Schnell which involve the process designated hereinabove by (iii) wherein phosgene is introduced into an aqueous solution of an alkali metal or an alkaline earth metal salt of a bisphenol such as the bis(hydroxyphenyl) alkanes in the presence of an excess of a base and in the presence of an inert solvent which is capable of dissolving both phosgene and the produced polyester.

It is a further object of this invention to provide a process for preparing a dope of a polyester derived from a bisphenol which can be formed by normal dope casting methods into a sheet useful as a strong transparent packaging material and in some cases useful as a photographic film base for light sensitive emulsions of the black-and-white or color types or other light sensitive coatings.

Among the objects of this invention is the provision of a new catalytic system in such a process whereby improved reaction conditions are achieved.

A further object of this invention is the provision of a process which is unexpectedly broad enough to encompass the joint polymerization of bisphenol simultaneously with phosgene and with an alkane dicarbonyl dichloride containing from 2 to 10 carbon atoms.

A further object of this invention is to provide a process for condensing bisphenols such as the bis(hydroxyphenyl) alkanes with alkane dicarbonyl dichlorides without the presence of phosgene whereby highly useful polyesters are produced.

A further object is the combined improvement of using a new catalyst of unusual efficacy in conjunction with the use of a solvent for phosgene prior to the introduction of the phosgene into the process whereby effective control of the process can be accomplished.

In accordance with a preferred embodiment of this invention there is provided a process for preparing a film-forming dope of a highly polymeric linear polyester of a bisphenol and a dibasic carboxylic acid having from 1 to 10 carbon atoms comprising (A) intermingling in a reaction zone at a temperature of from 5°–50° C. a two-phase mixture of (1) an aqueous phase essentially composed of one mole proportion of a bisphenol dissolved in from 2 to 10 times its weight of water containing at least two mole proportions of a compound selected from the group consisting of sodium hydroxide and potassium hydroxide in an amount sufficient to establish and maintain a pH of from about 12.5 to 14.0 and (2) a non-aqueous phase essentially composed of from one-half to three times the weight of said bisphenol of an inert organic solvent capable of dissolving said polyester as it is formed, said two-phase mixture containing from 0.05 to 5% by weight of said bisphenol of a catalyst comprising at least one trialkyl amine containing from 2 to 20 carbon atoms in each alkyl radical, (B) gradually adding to said two-phase mixture from in excess of 1.0 up to about 1.3 mole proportions of a carbonyl dichloride compound selected from the group consisting of liquid phosgene, phosgene dissolved in an inert organic solvent and dicarbonyl dichloride containing from 2 to 10 carbon atoms dissolved in said inert organic solvent, (C) reducing the pH to from 5 to 9, (D) allowing said two-phase mixture to separate into an upper and a lower phase in a suitable vessel and running liquid water into the lower phase at the bottom of said vessel under conditions such that the two phases are distinguishable by a horizontal plane demarkation showing the separation of the upper from the lower phase, (E) removing most of the increase in volume in the upper phase as it is diluted by said running water, (F) withdrawing substantially all of said upper phase after a drop thereof can be dried on glass without leaving any significant residue or incrustation, and (G) removing where necessary an amount of water from the lower phase in order to produce a clear dope, said dope being characterized in that it can be formed by ordinary dope casting techniques into a strong transparent film.

In accordance with various embodiments of this invention said bisphenols contain from 13 to 40 carbon atoms and have the following general formula:

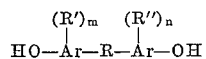

wherein R represent a hydrocarbon radical devoid of olefinic unsaturation containing from 1 to 20 carbon atoms selected from the group consisting of alkylene radicals, alkylidene radicals, and alkyl and aryl substituted alkylene and alkylidene radicals, each Ar represents an aromatic radical of the benzene and naphthalene series containing from 6 to 12 carbon atoms, each hydroxy radical is attached in a position relative to R other than ortho to R, each of R' and R'' represents a member selected from the group consisting of halogen atoms, hydrogen atoms, alkyl radicals, nitro radicals and alkoxy radicals situated in the available nuclear positions with respect to R and the hydroxy radicals, and each of $n$ and $m$ represents a number of from 1 to 4.

There is little point for specifically naming the great number of bisphenols which come within the scope of the formula given above. The best known compound is often referred to as bisphenol A and is more specifically designated 2,2-bis(4-hydroxyphenyl)-propane.

The specific names of a number of such compounds are illustrated by the disclosure in British Patent 772,627 beginning at line 66 in the second column on page 1 down to line 32 of the first column on page 2. Any of these compounds or mixtures can be employed in accordance with the present invention. Other examples are given elsewhere in the prior art. An especially valuable mixture of such compounds is that involving bisphenol A and 2,2-bis(3,5-dichloro-4-hydroxyphenyl) propane which can be called tetrachloro bisphenol A. The special properties of copolyesters of such a mixture are described in a separate patent application filed by Laakso and Buckley, Serial No. 815,251 filed on May 25, 1959, now Patent No. 3,038,874.

The prior art discloses the employment of a number of catalysts which can be employed in the particular type of process which is involved in the present application. Such compounds are said to include quaternary ammonium compounds such as benzyl triethyl ammonium chloride, benzyl phenyl diethyl ammonium chloride, diethyl dimethyl ammonium chloride, dibenzyl dipropyl ammonium bromide, and other homologous compounds containing alkyl and aryl radicals having from 1 to 20 carbon atoms in each radical. Although such catalysts can be used in practicing the process of this invention, an especially advantageous feature of this invention is accomplished by the employment of a trialkyl amine either alone or in conjunction with said quaternary ammonium compounds as the catalyst. Advantageously the trialkyl amine contains from 2 to 20 carbon atoms in each alkyl radical and constitutes from 5 to 100% by weight of the total catalyst composition.

In the preparation of polycarbonates from bisphenols and phosgene one of the problems encountered has been the inability to predict with any amount of certainty that the polymerization will actually occur in any reasonable length of time or at what rate the reaction will take place once it starts. This situation is overcome by that aspect of the present invention relating to the catalysts. In many cases the polymerization starts building up to a higher viscosity within about 25 minutes after all the phosgene has been added and can be stopped at a desired predetermined viscosity by adding enough glacial acetic acid or other acidic compound to neutralize the alkali or at least reduce the pH below about 9.0. In practice the time element is subject to variations depending on one or more variables such as speed and type of stirring, speed of addition of reagents, purity of solvent, pH, the particular catalyst, etc. In fact, prior to the present invention there have been many times when the reaction did not continue beyond the point where a low molecular weight polymer was formed even though a presumably effective quaternary ammonium catalyst such as benzyl triethyl ammonium chloride was employed.

Therefore, in accordance with one aspect of the present invention it has been discovered that, all other things being equal, by the addition of small amounts of the tertiary trialkyl amines or their hydrohalides alone in conjunction with a quaternary ammonium catalyst such as benzyl triethyl ammonium chloride the polymerization is assured of always taking place and the polymerization rate is accelerated so that improved results are obtained. The use of quaternary ammonium bases or their salts is illustrated in prior art such as Belgian 546,375.

Although the prior art describes a great variety of polycarbonates from bisphenol A and other bis(hydroxyphenyl)alkanes condensed with phosgene which have outstanding physical properties, the applicants have now found according to one aspect of their invention that similar and in some cases improved properties are possessed by new polyesters from various bisphenols such bis(hydroxyphenyl)alkanes or mixtures thereof condensed with either a dicarbonyl dichloride or a mixture of at least 5 (preferably 50) mole percent of such a dichloride with phosgene. The techniques of the process described herein are especially efficacious in the preparation of novel polyesters and copolyesters.

The dicarbonyl dichlorides which can be also designated as bis-acid chlorides include oxalyl, malonoyl, succinoyl, glutaroyl, adipoyl, pimeloyl, sebacoyl, azelaoyl, o-phthaloyl, iso-phthaloyl, terephthaloyl and other aliphatic and aromatic dicarbonyl dichlorides including fumaroyl dichloride, etc. These hydrocarbon aliphatic and aromatic dicarbonyl dichlorides can be used to entirely replace phosgene in the process described in general terms hereinabove or they can be used in admixture with phosgene. In either case it is especially advantageous to dissolve the dicarbonyl dichloride compound or compounds in an inert organic solvent such as methylene chloride so that the process described above can be carried out under carefully controlled conditions.

The employment of a solvent for the dicarbonyl dichloride compounds or for phosgene is efficacious in overcoming one of the problems encountered in preparing the class of polyesters with which this invention is concerned. This particular problem relates to the addition of the phosgene gas and the known reactants to the reaction mixture under conditions such that the interval of time is properly correlated with proper temperature control and molecular weight build-up. The known class of polycarbonates described in the prior art with which this invention pertains will degrade very rapidly at the high pH of 13-14 normally existing in the reaction mixture so that under those circumstances where the phosgene is added over too long a period of time the polymer formed will start to degrade faster than it can polymerize and as a result low molecular weight polymers will be obtained. Although the prior art describes instances wherein the use of phosgene dissolved in a solvent such as chloroform is employed, such disclosures do not recognize the advantages of using a solution of phosgene as a means for introducing the phosgene at a reasonable temperature in a short period of time as necessitated by the use of fast acting catalysts. By including this process technique involving the use of the improved catalysts of this invention, the problems usually encountered in the bubbling of gas directly into the highly alkaline medium are eliminated and the polymer produced is subject to much more precise control with regard to its degree of polymerization. Thus, in addition to such advantages the use of a solution of phosgene eliminates the need of weighing the amount of phosgene being added while the reaction is going on and enables the amount of phosgene in the reaction mixture at any given time to be accurately known. No costly specialized gas handling equipment is required at the point where the polymerization is taking place. Moreover, this method lends itself to more advantageous practice of some types of continuous processes of preparation of this class of polymers.

The same principles applying to the use of solutions of phosgene apply to the use of solutions of dicarbonyl dichloride compounds. Although such compounds may not be gaseous, it is advantageous to introduce them into the process as solutions in an inert solvent which may advantageously include at least 50% by volume of methylene chloride.

As regards the use of solutions of phosgene or for that matter any of the other dicarbonyl dichloride compounds, it is possible to introduce them during a definite time interval so that necessary control of molecular weight can be maintained whereby polymers having a desired viscosity can be readily obtained. Although it may appear that the carbonyl dichloride compounds including phosgene might be used in their liquid form such as by cooling phosgene sufficiently to cause it to liquify, it has been found that the use of solutions is more advantageous in accomplishing the improved results achieved by the present invention.

Although the range of pH set forth in the general description above is from 12.5 to 14, it is most advantageous to carry out the reaction at the upper limits approaching a pH of 14, e.g. from 13.5 to 14. As a result of the employment of such a high pH, the polymerization reaction takes place in a very thick emulsion in many cases. This emulsion breaks up somewhat when the agitation is stopped and the reaction terminated by neutralization of the alkali with the neutralizing agent such as glacial acetic acid. It has been found that glacial acetic acid is especially effective and it is preferred although other acids such as hydrochloric acid, a great number of other mineral or organic acids or acidic compounds even including phosgene can be employed to neutralize the reaction mixture. When the especially efficacious glacial acetic acid is used as the agent, the emulsion breaks up to form a lower phase which is a somewhat heavy viscous fluid which is quite difficult to wash by conventional washing procedures. Such procedures normally require generous stirring with water, separation of layers and a series of transfers from vessel to vessel. The use of such conventional washing procedures is obviously contemplated by various patents and in other disclosures set forth in the prior art and is normally considered to be a routine procedure.

It was, therefore, quite surprising when it was discovered that excellent results were obtained by introducing a continuous stream of water in the lower phase without agitation beyond that provided by the stream of water. By this laving process the two-phase reaction mixture was unexpectedly washed free of soluble materials without any troublesome handling and without the formation of any emulsion. This laving operation can be described as running liquid water in the lower phase in the vessel which may comprise the lower region of the reaction zone under conditions such that the two phases are distinguishable by a horizontal plane demarkation showing the separation between the upper and lower phases. During the laving the volume in the upper phase obviously increases due to the addition of the water and this increase can be mostly removed from the vessel as the upper phase becomes diluted by the running water. Of course, the vessel may be large enough to allow a considerable increase in this volume. On the other hand, it is most advantageous to keep the volume of the upper phase at a relatively low level since the efficiency of the laving is thereby increased. Of course, it is important that the rate of running the water into the lower phase be below that which would cause sufficient agitation to produce the formation of an emulsion of the two phases. The lower phase is then substantially completely separated or otherwise withdrawn from the upper phase after a drop thereof (upper phase) can be dried on glass without leaving any significant incrustation. At this point, there may still remain in the lower phase an amount of water whereby the lower phase may be somewhat cloudy. If desired, any objectionable amount of water remaining in the lower phase can be removed by any of a number of methods such as by adding commercial drying agents or by azeotropic distillation of the water, or by other means. In most cases, the boiling point of the azeotrope will be sufficiently low so that this can be done at relatively low temperatures. Methylene chloride itself has a boiling point of about 39° C. One technique which is especially advantageous for removing any objectionable water from the lower phase so as to form a clear dope is to chill the lower phase so as to form a gel and allow water to rise to the top of the gel from where it can be decanted off, after which the gel can be heated to room temperature to form a clear dope which can be coated to form a clear sheet.

The inert organic solvents which can be used in practicing the present invention have been listed in the cited prior art and include a great number of organic compounds. Since the process of this invention requires that the polymer dissolve in the solvent and since methylene chloride has been found to be one of the most effective solvents, it is often advantageous that the solvent contain at least 50% by volume of methylene chloride. Preferred embodiments of the invention use a solvent entirely composed of methylene chloride. The other solvents which can be used in conjunction with methylene chloride depend upon whether they are miscible and whether they adversely affect the effectiveness of the combination as a solvent for the polymer being formed. Among the various solvents which can be used in conjunction with methylene chloride are other halogenated hydrocarbons such as trichlorobenzene, chloroform, di- and trichloroethane, the various Freons, aromatic and aliphatic hydrocarbons, esters, ketones, alcohols, phenols, etc. Advantageously the solvent is one or more of the aliphatic and aromatic hydrocarbons and halogenated hydrocarbons containing from 1 to 10 carbon atoms which is a liquid under the reaction conditions and is capable of dissolving the polyester which is formed.

In carrying out a batch process according to this invention, the addition of the carbonyl dichloride compound (including phosgene) which is preferably dissolved in an inert organic solvent such as methylene chloride is advantageously performed over the course of from about 10 to 50 minutes. The amount of the carbonyl dichloride added is generally in slight excess of an equimolecular amount equivalent to the bisphenol. Thus, the preferred amounts range from 1.05 to 1.3 mole proportions for each mole proportion of the bisphenol. When large excesses are employed, the process of this invention cannot be effectively accomplished without unnecessarily added expense. By using a preferred catalyst provided by this invention and gradually adding the carbonyl dichloride at the prescribed rate, the reaction is usually complete within about 30 minutes after the carbonyl dichloride has been added. However, this time period can be varied from about 10 minutes to about 50 minutes. Thus, in practicing this invention, the longest period of time contemplated from the beginning of the gradual addition of the carbonyl dichloride up to the neutralization step might be as great as 100 minutes. However, the interval generally needed is much shorter.

As a consequence of the practice of this invention, a polyester can be readily produced so as to have a predetermined viscosity and consequently a predetermined molecular weight which can be accurately controlled by the selection of the catalyst, the temperature and the time intervals employed. For the formation of films, the dope being produced advantageously contains a polymer which has a viscosity on the order of from about 1.2 to about 1.8 when prepared from bisphenol A and phosgene. This viscosity is generally measured in chloroform or some other common solvent. The preferred viscosity range will vary depending upon the polyester.

The dope produced in accordance with the invention can be formed by ordinary dope casting techniques into film or can be used for other purposes depending upon the viscosity of the polymer and its composition. Low molecular weight polymer dopes can be used as subbings or for other layers on photographic film base and can be coated upon such film supports formed from the higher molecular weight polyester dopes of this invention. By such a technique, the subbing forms a connecting layer facilitating the adhesion of photographic gelatin emulsions to the higher molecular weight polyester base. The base can also be made from other polyesters such as polyethylene terephthalate, polycyclohexanedimethylene terephthalate, cellulose acetate, etc. Most advantageously, this invention is of particular value in the preparation of dopes from bisphenol A polycarbonates which have an inherent viscosity from about 1.2 to about 1.8. The polycarbonate films produced from such a dope have unusually excellent properties including great optical clarity, modulus of elasticity, tensile strength, elongation before break, ability to withstand folding such as measured by the M.I.T. folds test, tearing resistance, yield stress, heat softening temperature, percentage of swelling and shrinking in hot water or air at various relative humidities, etc. Other uses are mentioned hereinabove and in other cited prior art besides that referred to herein.

The following examples will serve to further illustrate the preferred embodiments of this invention although it will be understood that these examples are included merely for purposes of illustration and are not intended to limit the scope of the invention unless otherwise specifically indicated:

EXAMPLE 1.—GENERAL PROCEDURE FOR THE BATCH PREPARATION OF POLYESTERS

A 3-liter, 3-necked flask equipped with a stirrer, a separatory funnel having the tip extending below the level of the contemplated reaction mixture, and a thermometer can be used for the preparation of various polycarbonates from bisphenols such as bis(hydroxyphenyl)-alkanes. An illustrative batch using this apparatus involves adding 0.6 liter of distilled water, 125 g. (1.56 mole) sodium hydroxide as a 50% aqueous solution, 1 liter of distilled methylene chloride, 0.5 gram mole of a bis(hydroxyphenyl)alkane such as bisphenol A (114 g.)—or a mixture of various bis(hydroxyphenyl)alkanes such as a mixture of bisphenol A and tetrachloro bisphenol A—and 2.5 g. of a catalyst composed of a trialkylamine with or without a quaternary ammonium compound. Of course, the latter can be used alone with less advantageous results although such use will illustrate other aspects of the invention. The reaction mixture can be cooled to about 20-25° C. by immersing the flask in a water bath using ordinary tap water. With good stirring a solution of about 1.1 mole of phosgene or other carbonyl dichloride compounds or mixtures thereof dissolved in about 200 ml. of distilled methylene chloride can be added within a period of 55-60 minutes when the catalyst is a quaternary ammonium compound or in much less time if a trialkyl amine is present. After all the carbonyl dichloride compound in solution has been added, an additional 2.5 g. of the catalyst can be sometimes advantageously added. The cooling bath can be removed and in a normal polymerization the viscosity will build up in a period of 10 to 20 minutes. Much longer periods would be required if the trialkyl amine were omitted, e.g. 30 to 45 minutes. The reaction is stopped at the desired viscosity as measured by the flow of the viscous layer through a standard pipette. This can be accomplished by neutralizing the sodium hydroxide in the reaction mixture using an acid which is preferably glacial acetic acid. The polymer dope can then be purified by the laving operation described in greater detail hereinabove using water introduced into the lower polymer layer and removing the upper aqueous layer. When a drop of the upper layer can be dried on glass without forming an incrustation, the laving operation can be terminated and the lower layer used as a dope for the casting of film or any other useful product. If desired, the dope can be precipitated by adding acetone as when the polymerization is being carried out with bisphenol A whereby the polymer precipitates out as a fine white granular powder which can be dried at reduced pressure at 100° C.

This procedure specifically applied to the following materials is illustrative.

EXAMPLE IA

Chemicals:
  125 g. 50 percent sodium hydroxide solution
  600 ml. distilled water
  1000 ml. distilled methylene chloride
  114 g. (0.5 mole) 4,4'-bis(dihydroxydiphenyl)-2,2-propane
  5 g. (0.022 mole) benzyltriethylammonium chloride
  55 g. phosgene+200 ml. distilled methylene chloride

| Time | Temp., ° C. | pH | Remarks |
|---|---|---|---|
| 9:25 | 20 | 14 | Start adding phosgene solution. |
| 9:33 | 16 | 14 | |
| 9:45 | 17 | 14 | |
| 10:00 | 17 | 14 | |
| 10:15 | 19 | 14 | |
| 10:23 | 22 | 14 | |
| 10:24 | 23 | 14 | Phosgene solution all in. |
| 10:25 | 24 | 14 | 2.5 g. catalyst (benzyltriethylammonium chloride) added. |
| 10:58 | 17 | 14 | |
| 11:11 | 17 | 14 | Little or no apparent viscosity buildup. |
| 12:30 | 19 | 14 | |
| 12:45 | 19 | 14 | Acidify with glacial acetic acid. |

Yield, 93 g.; I.V. of 0.27 in 50 percent (by weight) phenol and chlorobenzene.

In the first instance, Example IA shows the results obtained in the absence of trialkyl amine whereas Example IB shows the advantage of the use of a trialkyl amine such as triethyl amine.

EXAMPLE IB

Chemicals:
  125 g. 50 percent sodium hydroxide solution
  600 ml. distilled water
  1000 ml. distilled methylene chloride
  5 g. catalyst (0.022 mole) benzyltriethylammonium chloride
  114 g. (0.5 mole) Bisphenol A (4,4'-bis(dihydroxy-diphenyl)-2,2-propane)
  55 g. phosgene+200 ml. distilled methylene chloride
  2 ml. triethylamine catalyst

| Time | Temp., °C. | pH | Remarks |
|---|---|---|---|
| 8:50 | 22 | 14 | Start adding phosgene solution. |
| 9:06 | 20 | 14 | |
| 9:25 | 20 | 14 | |
| 9:51 | 20 | 14 | Phosgene solution all in. |
| 9:52 | 21 | 14 | 2.5 catalyst added (quaternary ammonium) |
| 10:40 | 22 | 14 | No apparent viscosity increase. |
| 10:45 | 23 | 14 | 2 ml. triethylamine added. Rapid viscosity buildup. |
| 11:00 | 24 | 14 | Acidify with glacial acetic acid. |

Yield, 123 g.; I.V. of 2.56 in 50 percent (by weight) phenol and chlorobenzene.

The above apparatus was used as in Example IB to perform a number of other similar condensations using various bisphenols and carbonyl dichlorides. The results were substantially analogous to the specific cases described above.

Two additional examples wherein the apparatus employs a reflux condenser are shown by Examples 2 and 3. In these examples, the only catalyst employed was triethylamine. The phosgene solution was added prior to the addition of any catalyst. In this instance, the reaction takes place quite rapidly after the catalyst has been added and the reaction can be terminated after a predetermined period of stirring between the addition of the catalyst and the neutralization of the reaction mixture so as to achieve a viscosity which will lend itself most advantageously to whatever product is to be produced from the dope. The following examples illustrate this procedure when the dope is to be cast to form a film which is useful as a photographic base for a light sensitive emulsion.

EXAMPLE II

Into a one liter 3-necked, round-bottomed flask connected through ground glass joints to a reflux condenser, an addition funnel, and an efficient stirrer, was placed a solution of 11.4 g. (0.05 mole) of bis(4-hydroxyphenyl)-2,2-propane, 120 ml. of distilled water, and 12.5 g. of a 50 percent solution of sodium hydroxide in water. To this stirred solution was added from the addition funnel over a period of 0.5 minute 5.5 g. (0.055 mole) of phosgene carefully collected in 100 ml. of cold, redistilled methylene chloride. The opaque reaction mixture was stirred for 5 minutes. Methylene chloride refluxed slowly for a part of this time. (A thermometer inserted into the reaction mixture after this period indicated 35° C.) Then one ml. of a 10 percent solution of triethylamine in methylene chloride was added, which soon resulted in a rapid increase in the viscosity of the methylene chloride phase. After stirring for 10 minutes longer, the reaction mixture was acidified with excess glacial acetic acid. The aqueous phase was decanted, distilled water added, and stirring continued for 10 minutes. After decanting the aqueous phase again and adding acetone to the methylene chloride phase, solid polymer separated. The collected product, after drying, amounted to 11.3 g. and had an inherent viscosity in chloroform of 1.36.

EXAMPLE III

By a procedure similar to that described in Example II, except that at all times the reaction mixture was cooled to a temperature of 10°, addition of a phosgene solution over 20 minutes and subsequent identical treatment yielded 11.2 g. of polycarbonate having an inherent viscosity in chloroform of 1.43.

A further example using apparatus similar to that described in Example I but using only triethyl amine as the catalyst is as follows. In this example, the time from the addition of the catalyst to the acidification with glacial acid was only about 8 minutes with the polyester obtained having an I.V. of 3.20.

EXAMPLE IV

To a three-liter three-neck flask equipped with stirrer, a separatory funnel (the tip extending into the reaction mixture), and a thermometer, was added the following reagents:

600 ml. distilled water, 114 g. (1.42 mole) of 50 percent sodium hydroxide, one liter of distilled methylene chloride, 114 g. (0.5 mole) of Bisphenol A.

The reaction mixture was cooled to 3° C. by immersion of the flask in a crushed ice bath. With good stirring, a solution of 55 g. (1.1 mole) phosgene in 200 ml. of distilled methylene chloride was added in a period of seven minutes. Three minutes after the phosgene solution was in, 10 mls. of 10 percent triethylamine was added and the ice bath was removed. The build-up of the polymer was quite apparent after a five-minute period. The reaction was stopped at the desired viscosity by addition of glacial acetic acid. This polymer was purified by laving the methylene chloride layer with water as described above and precipitating the polymer from the methylene chloride by the addition of acetone. The polymer, in the form of a fine, white granular powder, was dried at reduced pressure at 100° C. The process can be summarized as follows:

Chemicals:
114 g. (1.42 mole) 50 percent sodium hydroxide
600 ml. distilled water
1000 ml. distilled methylene chloride
114 g. (0.5 mole) 4,4′-bis(dihydroxydiphenyl)-2,2-propane
10 ml. 10 percent triethylamine by volume (in distilled methylene chloride)
55 g. phosgene+200 ml. distilled methylene chloride

| Time | Temp., °C. | pH | Remarks |
|---|---|---|---|
| 9:45 | 3 | 14 | Start addition of phosgene solution. |
| 9:52 | 17.5 | 14 | Phosgene solution all in. |
| 9:55 | | | Add 10 ml. 10 percent triethylamine. |
| 10:00 | | | Build-up becoming very apparent. |
| 10:03 | | | Acidify with glacial acetic acid. |

Yield, 109 g.; I.V. of 3.20 in 50 percent (by weight) phenol and chlorobenzene.

The following example illustrating the performance of a reaction on a larger scale shows the inferior use of benzyl triethyl ammonium chloride (as compared to triethyl amine) as the catalyst, the catalyst being introduced prior to the introduction of the phosgene solution.

EXAMPLE V

In a 22 liter three-necked flask equipped with an efficient stirrer a solution of 530 g. (14 moles) sodium hydroxide (Note 1) and 200 g. of a benzyl triethyl ammonium chloride solution (25 percent by weight in distilled water) in 600 ml. distilled water was brought to a boil under an atmosphere of nitrogen, and cooled to 18° C. at once. One thousand one hundred and forty grams of 4,4′-dihydroxydiphenyl-2,2-propane (5 moles—commercial grade bisphenol A recrystallized from ethylene chloride—M.P. 157–157° C.) were added together with 8.8 liters of distilled methylene chloride. The temperature was kept at 20–27° C. with running water and with good stirring a solution of 550 g. (5.55 moles) of phosgene dissolved in 1200 ml. methylene chloride (Note 2) was run into the flask from a graduated dropping funnel below the surface of the reactants in 45 minutes. At the end of this time and after the temperature had fallen to 20° C. stirring was continued until the viscosity of the lower methylene chloride layer corresponded to an inherent viscosity of 1.0 for the polycarbonate. This was determined by watching the flow of the lower methylene chloride layer from a standardized large-bore pipette (Note 3). When the desired consistency had been obtained, the reaction mixture was immediately neutralized by adding an excess glacial acetic acid. After a period of good mixing, the methylene chloride layer was washed free from salts by laving as described above with running water. The last part of the laving was carried out with distilled water to insure complete absence of salts. The methylene chloride layer (Note 4), in this instance, was then precipitated into three volumes of methyl alcohol, bleached in fresh methyl alcohol, and dried.

The yield of pure white fibrous polymer was 1255 g. or 98.9 percent of the theoretical value. The inherent viscosity as determined in phenol - chlorobenzene (50:50)=0.98.

*Note 1*

The large excess of alkali is necessary in order to insure a pH of 13–14 at all times when using the conditions of this example.

*Note 2*

The phosgene was dissolved in the cold methylene chloride contained in a 3 liter Erlenmeyer flask by passing in phosgene from a 25 lb. cylinder through a sintered glass tube until the increase in weight was 550 g. The time for this operation depends on several factors such as stirring, speed of addition, and cooling.

*Note 3*

Other batches made in the same manner as described in Example V but using triethylamine as the catalyst were performed in time periods as little as one tenth of that required using only an ammonium catalyst.

*Note 4*

Various batches made in the manner described in Example V have been cast into useful films using the wet methylene chloride dope described. However, it is generally preferred to dry the dope to at least some extent prior to the casting of films.

As regards the preceding examples, it is preferred that the trialkyl amine be added in relatively small proportions when it is introduced prior to the addition of phosgene. In some cases, it has been found convenient to use the trialkyl amine in combination with the quaternary ammonium base or salt as illustrated above. The quaternary ammonium salt is not a very reliable catalyst unless it contains at least a sufficient percentage of a trialkyl amine such that the total concentration of the trialkyl amine in the reaction mixture is no less than about 0.001%. In most cases, it is advantageous to have the trialkyl amine constitute 5%–100% by weight of the total catalyst composition.

The following examples will more specifically further illustrate the formation of dopes which can be cast into film in accordance with the discovery that isolation of the polyester from its solution in methylene chloride is not necessary and can be advantageously avoided in an overall process designed to produce satisfactory coatings for film supports. Prior to the laving operation described above, the reaction mixture at the time of the neutralization of sodium or potassium hydroxide consists of the methylene chloride solution as a lower layer and an aqueous solution containing various salts such as sodium chloride and sodium acetate as the upper layer. The lower layer also contains some water and some of these salts. By employing the described laving operation, substantially all of the salts can be washed out leaving a mixture of methylene chloride solution containing the polymer and water. In many cases, the methylene chloride solution or dope of the polymer is clear, colorless, viscous and contains only a very small amount of water which may or may not be a hindrance to the coating of film depending upon what coating conditions are employed. However, in some cases the dope may be cloudy and contain more water than is desirable so that it is advantageous to remove some or substantially all of this water. The dope can be dehydrated with desiccating agents, or concentrated by heating (whereby a considerable amount of the water present may be removed azeotropically) to give a concentration and viscosity suitable for coating on conventional roll coating or film-casting equipment. By such a procedure, considerable economies can be effected, such as avoiding the costly procedure of isolating the polymer from the methylene chloride solution by precipitation in an organic medium (e.g. methanol) and subsequently the drying of the polymer—both of which are costly processes.

The following four examples were performed using the lower layers from various polymerization processes using bisphenol A and phosgene as described hereinabove which are referred to as methylene chloride dopes in the following examples. Some of the properties of the sheets produced using such water laved dopes are presented following each example including Young's modulus of elasticity, folding qualities (M.I.T. folding test), tear resistance, etc. The Drierite material mentioned is a commercial desiccant described in Zimmerman's handbook; many other equivalent desiccants are readily available on the market.

EXAMPLE VI

A methylene chloride dope (of about 11 percent concentration weight) containing water was concentrated by azeotropic distillation to about 13 percent by stirring vigorously in a partially enclosed flask jacketed by water at 45° C. for about 30 minutes. The resulting dope after removal of bubbles was clear (whereas original dope was cloudy) and could be coated to give a clear sheet with the following properties:

Young's modulus of sheet _____ $2.12 \times 10^4$ kgs./cm.$^2$
Tensile strength _____ 610 kgs./cm.$^2$
Elongation _____ 61 percent
M.I.T. folds _____ 300
Research tear _____ 71

EXAMPLE VII 200 grams of a methylene chloride dope (11 percent solid) was mixed in a closed bottle with 10–15 grams Drierite desiccant for 2 hours, and then allowed to stand for 1–2 hours. Dope became clear and could be decanted and coated to a clear sheet having the following properties:

Young's modulus of sheet _____ $2.20 \times 10^4$ kgs./cm.$^2$
Tensile strength _____ 540 kgs./cm.$^2$
Elongation _____ 31 percent
M.I.T. folds _____ 250
Research tear _____ 70

EXAMPLE VIII

The same procedure as in Example VII was used except that the dope was first filtered and then Drierite added. Coated sheets were clear and had the following properties:

Young's modulus of sheet _____ $2.30 \times 10^4$ kgs./cm.$^2$
Tensile strength _____ 585 kgs./cm.$^2$
Elongation _____ 62 percent
M.I.T. folds _____ 260
Research tear _____ 78

EXAMPLE IX 200 grams of a methylene chloride dope (11 percent solid) in a glass flask was chilled for 1–2 hours, thereby forming an opaque gel. Water rises to top of the gel and was decanted off. The gel on heating to room temperature forms a clear solution, which was coated to a clear sheet with the following properties:

Young's modulus of sheet _____ $2.37 \times 10^4$ kgs./cm.$^2$
Tensile strength _____ 730 kgs./cm.$^2$
Elongation _____ 57 percent
M.I.T. folds _____ 250
Research tear _____ 75

In the preceding examples, the carbonyl dichloride compound has been phosgene. According to one of the unexpected discoveries embodied within the various aspects of this invention, it has been found that other bis-acid chlorides as mentioned hereinabove can be employed alone or in combination with phosgene under identical reaction conditions. The following examples serve to illustrate this aspect of the invention.

EXAMPLE X.—POLYESTER FROM BIS-PHENOL A AND SUCCINOYL CHLORIDE

One hundred and fourteen g. (0.5 mole) bisphenol A, a solution of 57 g. (1.4 mole) sodium hydroxide in 600 ml. of distilled water, 1000 ml. distilled methylene chloride and 5 g. (0.022 mole) benzyl triethylammonium chloride were stirred and cooled to 20° and treated with 77.5 g. (0.5 mole) of succinoyl chloride in 200 ml. dry methylene chloride over a period of one hour. After 35 minutes, the reaction mixture was neutralized with glacial acetic acid and washed free of salts with running water. The resulting viscous dope was separated and precipitated by diluting with acetone. The slightly colored, tough polymer was obtained in 91 percent yield and had an inherent viscosity of 0.51 as determined in 50:50 phenol-chlorobenzene.

Much more rapid results were obtained using tri-n-butylamine as the sole catalyst.

*Analysis.*—Calculated for $C_{19}H_{18}O_4$ was C, 73.5; H, 5.8: Found was C, 73.0; H, 5.9.

Some of the physical properties of the film coated from this polyester are listed below:

Young's modulus _____ $2.1 \times 10^4$ kg./cm.$^2$
Tensile strength _____ 600 kg./cm.$^2$
M.I.T. folds _____ 138
Resistance to tear _____ 100
Elongation _____ 4 percent
Heat distortion temperature _____ 108° C.
Swell and shrink _____ 0.2 percent (125° F.)
Melting point _____ 187° C.

EXAMPLE XI.—POLYESTER FROM BIS-PHENOL A AND GLUTAROYL CHLORIDE 57 g. (0.25 mole) Bisphenol A
28.5 g. (0.7 mole) sodium hydroxide
300 ml. distilled water
1000 ml. distilled methylene chloride
42.5 g. (0.25 mole) glutaroyl chloride in 100 ml. dry methylene chloride
2.5 g. (0.011 mole) benzyltriethylammonium chloride.

The procedure was the same as in Example X. The temperature at the start of the reaction was 16°.

A colorless polymer was obtained in 90 percent yield having an inherent viscosity of 0.79 in 50:50 phenol-chlorobenzene.

Much more rapid results were obtained using tri-iso-amylamine as the catalyst.

*Analysis.*—Calculated for $C_{20}H_{20}O_4$ was C, 74.1; H, 6.2. Found: C, 73.9; H, 6.1.

Some of the physical properties of film coated from this polyester are listed below:

Young's modulus _____ $1.76 \times 10^4$ kg./cm.$^2$
Tensile _____ 450 kg./cm.$^2$
M.I.T. folds _____ 250
Resistance to tear _____ 120–130
Folds _____ 100
Stretch _____ 5 percent
Heat distortion temperature _____ 83° C.
Swell and shrink _____ 0.15 percent
Melting point _____ 171° C.

EXAMPLE XII—COPOLYESTER OF BISPHENOL A CARBONATE AND BISPHENOL - A - o - PHTHALOYL CHLORIDE POLYESTER 114 g. (0.5 mole) Bisphenol A
600 ml. distilled water
1000 ml. distilled methylene chloride
125 g. 50 percent sodium hydroxide solution
51.7 g. (0.5225 mole) phosgene and
5.6 g. (0.0275 mole) o-phthaloyl chloride in 200 ml. dry methylene chloride The procedure was the same as in Example X. The temperature at the start of the reaction was 18° C.

A colorless polymer was obtained in 90 percent yield having an inherent viscosity of 1.51 in 50:50 phenol-chlorobenzene.

Much more rapid results were obtained using trialkyl amines as catalysts either alone or mixed with an ammonium catalyst.

Some of the physical properties of this copolyester are listed below:

Young's modulus _____ $2.5 \times 10^4$ kg./cm.$^2$
Tensile _____ 665 kg./cm.$^2$
Elongation _____ 5 percent
Folds _____ 80
Resistance to tear _____ 90
Melting point _____ 215° C.
Heat distortion temperature _____ 128° C.
Swell and shrink _____ low EXAMPLE XIII.—PREPARATION OF BISPHENOL A COPOLYMER WITH 90:10 PHOSGENE-PHTHALOYL CHLORIDE 114 g. Bisphenol A
57 g. NaOH
500 cc. distilled water
800 cc. distilled methylene chloride
46 g. phosgene
6 g. o-phthaloyl chloride
5 g. benzyltriethylammonium chloride
1 cc. triethylamine The procedure was essentially the same as for Example X (the temperature was 18°); however, the condensation was complete in just a few minutes.

The polymer obtained had a viscosity in 50:50 phenol-chlorobenzene of 1.49.

Some of the physical properties of a film made from this polyester are listed below:

Young's modulus _____ $2.51 \times 10^4$ kgs./cm.$^2$
Tensile strength _____ 625 kgs./cm.$^2$
Yield strength _____ 600 kg./cm.$^2$
Elongation _____ 7 to 8 percent
Flow point _____ 211° C.
M.I.T. folds _____ 205
Resistance to tear _____ 108

EXAMPLE XIV.—PREPARATION OF BISPHENOL A COPOLYMER WITH 90:10 PHOSGENE-ISO-PHTHALOYL CHLORIDE 114 g. Bisphenol A
57 g. NaOH
500 cc. distilled water
800 cc. distilled methylene chloride
46 g. phosgene
6 g. isophthaloyl chloride
5 g. benzyltriethylammonium chloride
1 cc. triethylamine The procedure was essentially the same as in Example X (the initial temperature was 12° C.); however, the condensation was complete in just a few minutes.

The polymer obtained had a viscosity of 1.31 in 50:50 phenol-chlorobenzene.

Some of the physical properties of a film made from this polyester are listed below:

Young's modulus _____ $2.31 \times 10^4$ kg./cm.$^2$
Tensile strength _____ 600 kg./cm.$^2$
Yield strength _____ 600 kg./cm.$^2$
Flow point _____ 210° C.
M.I.T. folds _____ 215
Resistance to tear _____ 120
Elongation _____ 17 percent EXAMPLE XV.—PREPARATION OF BISPHENOL A COPOLYMER WITH 90:10 PHOSGENE-TEREPHTHALOYL CHLORIDE 114 g. Bisphenol A
57 g. NaOH
500 cc. distilled water
800 cc. distilled methylene chloride
46 g. phosgene
6 g. terephthaloyl chloride
5 g. benzyltriethylammonium chloride
1 cc. triethylamine The procedure was essentially the same as in Example X; however, the initial temperature was 6° C. and the condensation was complete in just a few minutes.

The polymer obtained had a viscosity of 1.65 in 50:50 phenol-chlorobenzene.

Film from this polymer had physical properties as listed below:

Young's modulus _____ $2.38 \times 10^4$ kg./cm.$^2$
Tensile strength _____ 570 kg./cm.$^2$
Yield strength _____ 550 kg./cm.$^2$
Elongation _____ 12 percent
Flow point _____ 218° C.
M.I.T. folds _____ 190
Resistance to tear _____ 105

EXAMPLE XVI.—PREPARATION OF BISPHENOL A COPOLYMER WITH 90:10 PHOSGENE-FUMARYL CHLORIDE 114 g. Bisphenol A
57 g. NaOH
500 cc. distilled water
800 cc. distilled methylene chloride
46 g. phosgene
7.65 g. fumaryl chloride
5 g. benzyltriethylammonium chloride
1 cc. triethylamine The procedure was the same as in Example X; however, the initial temperature was 11° C. and the condensation was complete in just a few minutes.

The polymer obtained had a viscosity of 1.77 in 50:50 phenol-chlorobenzene. The properties of this polymer were especially unobvious and highly useful.

Films from this polymer had the following physical properties:

Young's modulus _____ $2.32 \times 10^4$ kg./cm.$^2$
Tensile strength _____ 6.35 kg./cm.$^2$
Yield strength _____ 520 kg./cm.$^2$
Elongation _____ 54 percent
Flow point _____ 262° C.
M.I.T. folds _____ 330
Resistance to tear _____ 110

EXAMPLE XVII.—PREPARATION OF BISPHENOL A-ORTHOPHTHALOYL CHLORIDE POLYESTER

Eighty-five g. of phthaloyl chloride was added dropwise to a two-phase system composed of 95 g. Bisphenol A, 47.5 g. of sodium hydroxide pellets, 500 cc. of distilled water, 750 cc. of distilled methylene chloride and 10 g. of benzyltriethylammonium chloride. The addition time was one hour in a temperature range of 18–22° C. A sample taken at this point had a viscosity of 0.61. After stirring 30 minutes, 50 ml. of triethylamine was added. After 5 additional minutes, the reaction mixture was acidified with glacial acetic acid. The organic layer was laved continuously with water until a neutral pH was attained. The organic layer was added to acetone thereby precipitating a white fibrous polymer. The polymer was filtered and vacuum dried at 25° C. A viscosity of 0.76 was attained in 50:50 phenol-chlorobenzene.

A film made from this polymer had the following physical properties:

Young's modulus _____ $1.23 \times 10^4$ kg./cm.$^2$
Tensile strength _____ 700 kg./cm.$^2$
Elongation _____ 1 percent
M.I.T. folds _____ 1
Resistance to tear _____ 10
Melting point _____ 214° C.
Appearance _____ Opaque and brittle

EXAMPLE XVIII.—PREPARATION OF BISPHENOL A-ADIPYL CHLORIDE POLYESTER

Ninety-two g. of adipyl chloride in 400 ml. of distilled dried methylene chloride was added dropwise to a two-phase system composed of 114 g. of Bisphenol A, M.P. 157–9° C., 57 g. of sodium hydroxide pellets, 600 cc. of distilled water, 600 cc. of distilled methylene chloride and 10 g. of benzyltriethylammonium chloride. The addition time was 45 minutes at a temperature of 20° C. ± 3° C. The polymer built up viscosity in the methylene chloride layer and 50 minutes after the acid chloride had been added, the reaction mixture was acidified with glacial acetic acid. After stirring 15 minutes, the methylene chloride layer was laved continuously with water until a neutral pH was attained. The polymer in the organic layer was separated and precipitated into acetone. The solid formed was filtered and vacuum dried at 25° C. The resulting polymer had an inherent viscosity of 0.62 in 50:50 phenol-chlorobenzene.

A film made from this polymer had the following physical properties:

Young's modulus _____ $1.65 \times 10^4$ kg./cm.$^2$
Tensile strength _____ 410 kg./cm.$^2$
Elongation _____ 3 percent
Melting point _____ 82° C.
M.I.T. folds _____ >1000 (stretchy)
Resistance to tear _____ 150

When employing the techniques described for the present invention, polymers can be obtained which have unusually excellent properties as illustrated by those set forth in the following table.

TABLE I.—PHYSICAL PROPERTIES OF BISPHENOL A+ PHOSGENE POLYCARBONATE FILM USING A ROLL COATING MACHINE

| Physical Properties | Polycarbonate | | Cellulose Acetate | Polyethylene Therephthalate | Polystyrene |
|---|---|---|---|---|---|
| | Along | Across | | | |
| Thickness (in.) | 0.0048 | 0.0048 | 0.0055 | 0.004 | 0.005 |
| Young's Modulus (kg./cm.$^2$) (values are all $\times 10^4$) | 2.3 | 2.3 | 3.7 | 4.5 | 3.5 |
| Yield stress (kg./cm.$^2$) | 705 | 700 | 700 | 1000 | 800 |
| Tensile strength (kg./cm.$^2$) | 750 | 755 | 1200 | 1800 | 800 |
| Elongation (percent) | 92 | 106 | 34 | 130 | 4 |
| MIT folds | 148 | 127 | 35 | >15,000 | 50 |
| Tear strength (g.) | 67 | 75 | 55 | 200 | 20 |
| Heat softening temp. (° C.) | 178 | 150 | 155 | 180 | 100 |
| Swell and shrink (percent) | a 0.06 / b 0.012 | 0.06 / 0.014 | 0.60 / ---- | 0.10 / 0.08 | 0.0 / 0.0 | a 0.5 hr. in water at 125° F., 1 hr. at 125° F. in air. 3 cycles.
b 24 hr. swell in water at 70° F., dried at 15 percent R.H. at 70° F.

From an examination of the properties recorded in Table I, certain qualitative conclusions can be drawn and these in general confirm various other evaluations made on extruded or hand-coated sheets. It is apparent that the Young's modulus is rather low as compared with other film support materials. Undoubtedly this is too low for certain products, but it is adequate for some photographic sheet materials such as used in the graphic arts. The fact that such a product is on the European market indicates that the low modulus value is not a serious objection. Tensile strength of the films coated was definitely inferior to both cellulose acetate and polyethylene terephthalate but of about the same order of magnitude as polystyrene. It should be noted that the yield stress is comparable to cellulose acetate. This value can be of greater significance than the ultimate strength in materials of high elongation. The percent elongation was superior to cellulose acetate and polystyrene. This was also true of the flexibility and tear values. The heat softening temperature (HST) was satisfactory and better than polystyrene. The percent swell and shrink values are somewhat better than polyethylene terephthalate but inferior to polystyrene. However, other factors involving dimensional stability include keeping shrinkage (solvent loss) and humidity amplitude (effect of emulsion shrinkage).

The data presented in Table I do not represent the ultimate values obtainable but are merely illustrative of ordinary coating technology, nor do the physical properties necessarily represent the best values obtainable. It is apparent that improvements in the values can be obtained by using variations in inherent viscosity, purity, copolymers, block polymers, different coating conditions and solvents, polymers containing plasticizers, etc. In fact, data has been obtained showing that plasticizers such as triphenyl phosphate or methyl phthalate result in polycarbonate films having greater Young's modulus. These features are involved:

(a) 10 to 20 parts of a plasticizer such as triphenyl phosphate or methyl phthalate based on 100 parts dry polymer doped in a suitable solvent.

(b) Films containing plasticizer have a Young's modulus=$2.8 \times 10^4$ kg./cm.$^2$ as compared with 2.2–2.4 for unplasticized base. Tensile strength values are increased from 630 to 850 kg./cm.$^2$. Residual solvent in plasticized base is less than 0.1% as compared with 1.4% in unplasticized base.

The following examples will illustrate the method of preparing polycarbonate dopes containing plasticizers.

(1) A dope consisting of 100 grams polycarbonate (intrinsic viscosity=1.0 to 2.0) dissolved in 400 grams methylene chloride was mixed thoroughly with 10–20 grams triphenyl phosphate, coated on glass plates, stripped and cured 20 hours in an air oven at 70° C. Physical properties of cured sheets are shown in the following table.

TABLE II

| Polycarbonate | Young's Modulus, ×10⁴ kg./cm.² | Yield Strength, kg./cm.² | Tensile Strength, kg./cm.² | Elongation, percent | Residual Solvent, weight percent |
|---|---|---|---|---|---|
| 0 plasticizer | 2.13 | 630 | 725 | 100 | 1.41 |
| +10 parts triphenyl phosphate | 2.56 | 770 | 770 | 4 | 0.50 |
| +15 parts triphenyl phosphate | 2.86 | 855 | 855 | 4 | 0.05 |
| +20 parts triphenyl phosphate | 2.86 | 780 | 780 | 15 | |

(2) A dope consisting of 100 grams polycarbonate dissolved in 400 grams methylene chloride was mixed thoroughly with 10 grams methyl phthalate, coated, stripped and cured 20 hours in a 70° C. air oven. Physical properties of cured sheets are shown in the following table.

TABLE III

| Polycarbonate | Young's Modulus, ×10⁴ kg./cm.² | Yield Strength, kg./cm.² | Tensile Strength, kg./cm.² | Elongation, percent |
|---|---|---|---|---|
| 0 plasticizer | 2.10 | 610 | 610 | 52 |
| +10 parts methyl phthalate | 2.53 | 634 | 634 | 20 |

It appears that the addition of plasticizer to polycarbonate dopes facilitates removal of solvent, which may account for an increase in modulus and tensile strength. However, studies on more rigorous curing of unplasticized films indicate that other factors are involved. For example, when unplasticized film of 1% residual solvent and Young's modulus $2.0$–$2.2 \times 10^4$ kg./cm.$^2$ is cured further to residual solvent 0.1% or less, the modulus increased only to $2.4$–$2.5 \times 10^4$ kg./cm.$^2$ instead of the $2.6$–$2.8 \times 10^4$ kg./cm.$^2$ obtained with plasticized films. It appears that the presence of plasticizer facilitates solvent removal and yields a film of different structure from that obtained in the absence of plasticizer.

The invention has been described in detail with particular reference to preferred embodiments thereof, but it will be understood that variations and modifications can be effected within the spirit and scope of the invention as described hereinabove and as defined in the appended claim.

We claim:

A process for preparing a highly polymeric linear polyester of 2,2-bis(4-hydroxyphenyl) propane, phosgene and fumaryl chloride comprising (A) intermingling in a reaction zone at a temperature of from 5°–50° C. a two-phase mixture of (1) an aqueous phase essentially composed of 2,2-bis(4-hydroxyphenyl) propane dissolved in from 2 to 10 times its weight of water containing in excess of two mole proportions of sodium hydroxide in an amount not exceeding about 3 mole proportions and sufficient to establish a pH of from 12.5 to 14.0 and (2) a non-aqueous phase essentially composed of methylene chloride in an amount equal to from about one half to about three times the weight of said 2,2-bis(4-hydroxyphenyl) propane, said mixture containing from 0.05 to 5% by weight of said 2,2-bis(4-hydroxyphenyl) propane of a catlyst composed of triethylamine in combination with benzyltriethylammonium chloride, (B) gradually adding to said two-phase mixture from about 1.05 to 1.3 mole proportions of a mixture consisting of about 90 mole percent phosgene and about 10 mole percent fumaryl chloride dissolved in said methylene chloride, (C) stopping the reaction by reducing the pH to from 5 to 9, (D) allowing said two-phase mixture to separate into a lower phase and an upper phase in a vessel without any intermingling action and running water into the lower phase in the vessel under conditions such that the two phases are distinguishable by a horizontal plane demarkation showing the separation of the upper from the lower phase, removing most of the increase in volume in the upper phase from the vessel as it is diluted by said running water, withdrawing substantially all of said upper phase after a drop thereof can be dried without leaving any significant residue, and removing any necessary amount of water from the lower phase to produce a clear dope, said dope being characterized in that it can be formed by ordinary dope casting techniques into a strong transparent film.

References Cited in the file of this patent

UNITED STATES PATENTS

| | | |
|---|---|---|
| 2,675,367 | Caldwell | Apr. 13, 1954 |
| 2,708,617 | Magat et al. | May 17, 1955 |

FOREIGN PATENTS

| | | |
|---|---|---|
| 546,375 | Belgium | Mar. 26, 1955 |
| 772,627 | Great Britain | Apr. 17, 1957 |
| 1,046,311 | Germany | Dec. 11, 1958 |

OTHER REFERENCES

Schnell: Angewandte Chemie, 68, No. 20, pp. 633–640, Oct. 21, 1956.